Aug. 6, 1957     D. L. BENNETT     2,801,690

DRAPERY TRAVERSE

Filed June 13, 1956

*INVENTOR:*
DALE L. BENNETT
BY
ATT'YS

United States Patent Office 2,801,690
Patented Aug. 6, 1957

2,801,690
DRAPERY TRAVERSE

Dale L. Bennett, La Grange, Ill.

Application June 13, 1956, Serial No. 591,233

1 Claim. (Cl. 160—343)

This invention relates to drapery traverses.

The main objects of this invention are to provide an improved form of mechanism for effecting the reciprocation of slidable drapery hangers on a mounting support; to provide an improved drapery hanger reciprocating-mechanism for oppositely shifting sets of drapery hangers toward and away from a median point on the support; and to provide an improved drapery traverse of this kind which is extremely simple in construction, hence very economical to manufacture and practically free of operational failures.

In the particular embodiment shown in the accompanying drawings:

Fig. 1 is a longitudinal section of an improved drapery traverse constructed in accordance with this invention;

Fig. 2 is a cross-sectional detail taken on the plane of the line 2—2 of Fig. 1;

Fig. 3 is a cross-sectional detail taken on the plane of the line 3—3 of Fig. 1;

Fig. 4 is a cross-sectional detail taken on the plane of the line 4—4 of Fig. 1, and Fig. 5 is a right-hand end view of Fig. 1.

The essential concept of this invention involves an oppositely-threaded shaft journaled medially and at its ends on a supporting frame and embraced by threaded and unthreaded sleeves to which are secured the drapery hangers.

A drapery traverse embodying the foregoing concept comprises a mounting member 6 journalling an oppositely-threaded shaft 7 whereon is reciprocatingly shiftable drapery hanger sleeves 8 and 9, and at one end of which shaft 6 is secured a shaft-rotating means 10.

The mounting member 6 here is shown to be of hollow rectangular cross-section with a slot 11 extending longitudinally along one side thereof. The mounting member is secured to a window frame or wall by suitable brackets, not here shown. At the opposite ends and medially of the mounting member 6 are arranged brackets 12 and 13 respectively, which journal bearings 14 whereon the shaft 7 is supported.

The brackets 12 and 13 are of U-shape, cradle-like form. They are anchored in their respective positions by washered nuts 15 screwed into the base part of the respective brackets 12 and 13. The transverse parallel arms 16 of each bracket have aligned openings 17 wherein are supported the respective bearings 14.

The bearings 14, preferably formed of some non-metallic material such as "nylon," are larger in diameter than the openings 17. However, these bearings 14 have hubs 18 formed thereon which fit in the bracket openings 17 and thus support the bearings 14 against axial movement in their brackets 12 and 13.

The shaft 5 is most practically made in two oppositely threaded sections 6a and 6b. The threads preferably are double so as to effect an easy and rapid movement of the sleeves 8 and 9 thereon when the shaft 6 is turned. The shaft sections 6a and 6b abut in the sleeve 14 in the medial bracket 13 and are keyed to that bearing by set screws 19. Similarly, the respective shaft sections 6a and 6b are keyed to the end bearings 14 by set screws 19'.

The drapery-supporting sleeves 8 and 9 preferably are also formed of "nylon," or some comparable synthetic material. Imbedded in each sleeve is a drapery-suspending hanger 20 the exposed portion of which has a pair of small apertures 21.

The sleeves 8 are internally threaded to fit the threads of the respective shaft sections 6a and 6b to feed along the shaft 6 in opposite directions as the shaft is oppositely rotated. Secured to each of the hangers 20 on the sleeves 8 is an angle extension 22, which are oppositely disposed so as to overlap when the sleeves 8 are abutting the medial bracket 13. This causes the draperies to overlap along their opposed vertical edges and thereby avoid a gap when the draperies are closed across the window.

The sleeves 9 are not threaded but simply slide along the shaft 6. A desired plurality of them are interposed between the threaded sleeves 8 and the respective end brackets 12.

The shaft-rotating means 10 here is shown in the form of a sprocket 23 over which runs a bead chain 24. The opposite pulling of the chain 24 effects the reverse rotation of the shaft 6 and the reverse axial movements of the sleeves 8 on the respective shaft sections 6a and 6b. The movement of the sleeves 8 outwardly away from the medial bracket 13 causes the non-threaded sleeves 9 to successively move into abutting positions against the end brackets 12. Since the draperies suspended on the hangers 20, span the several sleeves 8 and 9, the return movement of the sleeves 8 toward the medial bracket 13 effects a uniform spacing of the sleeves 9 along the respective shaft sections 6a and 6b.

Although but one specific embodiment of this invention is herein shown and described, it will be understood that numerous details of the construction shown may be altered or omitted without departing from the spirit of the invention as defined by the following claim.

I claim:

A drapery traverse comprising, a rectangular-shaped tubular mounting member having a slot extending longitudinally of one of the sides and communicating with the interior of the member, three U-shaped cradle-like brackets the parallel end parts of which have alined apertures formed therein, the brackets being slidable endwise into the mounting member, headed fasteners extending through the member slot and secured to the respective brackets for adjustably positioning the brackets at the respective ends and at an intermediate point of the mounting-member, cylindrical bearings of a diameter greater than the diameter of the apertures in the cradle end parts and having end hubs dimensioned to fit in the cradle end-parts apertures to rotatively support the bearings in the respective cradle brackets, a pair of oppositely-threaded shaft sections keyed in axially-aligned relationship to the bracket bearings, a pair of internally-threaded hanger-supporting sleeves embracing the respective shaft sections on opposite sides of the intermediate bracket, a plurality of non-threaded hanger-supporting sleeves embracing the respective shaft sections between the threaded sleeves and the end brackets, and a chain-pull sprocket secured to one of the shaft sections to turn the same for oppositely reciprocating the sleeves thereon.

References Cited in the file of this patent

UNITED STATES PATENTS 2,256,008     Armstrong _____ Sept. 16, 1941

FOREIGN PATENTS 796,213     France _____ Jan. 17, 1936